United States Patent
Ulupinar et al.

(10) Patent No.: US 8,559,396 B2
(45) Date of Patent: Oct. 15, 2013

(54) MULTIPLE BINDINGS HAVING INDEPENDENT FORWARD AND REVERSE LINK BINDINGS FOR MOBILE INTERNET PROTOCOLS

(75) Inventors: Fatih Ulupinar, San Diego, CA (US); Jun Wang, La Jolla, CA (US); Peerapol Tinnakornsrisuphap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1188 days.

(21) Appl. No.: 12/138,793

(22) Filed: Jun. 13, 2008

(65) Prior Publication Data

US 2008/0310349 A1 Dec. 18, 2008

Related U.S. Application Data

(60) Provisional application No. 60/944,777, filed on Jun. 18, 2007.

(51) Int. Cl.
 *H04W 4/00* (2009.01)
 *H04W 36/00* (2009.01)
 *H04L 12/28* (2006.01)
 *H04B 7/00* (2006.01)

(52) U.S. Cl.
 USPC ............ 370/332; 370/401; 455/442; 455/500

(58) Field of Classification Search
 USPC ............ 370/328, 390, 395; 455/403; 709/200
 See application file for complete search history.

(56) References Cited

U.S. PATENT DOCUMENTS

| | | | | |
|---|---|---|---|---|
| 7,623,497 | B2 * | 11/2009 | O'Neill | 370/338 |
| 2003/0224758 | A1 * | 12/2003 | O'Neill et al. | 455/411 |
| 2004/0029555 | A1 * | 2/2004 | Tsai et al. | 455/403 |
| 2004/0082330 | A1 * | 4/2004 | Marin | 455/438 |
| 2004/0213278 | A1 | 10/2004 | Pullen et al. | |
| 2005/0036504 | A1 | 2/2005 | Joshi et al. | |

(Continued)

FOREIGN PATENT DOCUMENTS

| | | |
|---|---|---|
| EP | 1451979 | 9/2004 |
| WO | 2006088661 | 8/2006 |

OTHER PUBLICATIONS

S. Gundavelli, Proxy Mobile IPv6-draft-IETF-netlmn-, Apr. 8, 2007, IETF, pp. 1-8.*

(Continued)

*Primary Examiner* — Faruk Hamza
*Assistant Examiner* — Cassandra Decker
(74) *Attorney, Agent, or Firm* — Darren M. Simon

(57) ABSTRACT

Methods, apparatus, systems and computer program products are defined that provide multiple bindings in a Mobile Internet Protocol (MIP) network environment. The multiple bindings that are established are independent of one another, such that a forward link binding is decoupled from, or otherwise does not affect, a reverse link binding and vice versa. Multiple reverse link-only bindings may be established within an active route set for an access terminal. Additionally a single primary binding may be established that provides a forward link binding and reverse link binding. At any point in time, the access terminal may maintain only one primary binding.

33 Claims, 10 Drawing Sheets

(56) References Cited

U.S. PATENT DOCUMENTS

| | | | |
|---|---|---|---|
| 2005/0044362 A1* | 2/2005 | Haddad et al. | 713/170 |
| 2005/0165949 A1 | 7/2005 | Teague | |
| 2006/0133409 A1* | 6/2006 | Prakash et al. | 370/450 |
| 2006/0209759 A1* | 9/2006 | Vesterinen | 370/331 |
| 2006/0218302 A1 | 9/2006 | Chia et al. | |
| 2006/0251044 A1* | 11/2006 | Haddad | 370/349 |
| 2006/0268784 A1* | 11/2006 | Lee et al. | 370/331 |
| 2006/0285520 A1* | 12/2006 | Venkitaraman | 370/331 |
| 2007/0104170 A1 | 5/2007 | Leung et al. | |
| 2007/0160049 A1* | 7/2007 | Xie et al. | 370/390 |
| 2007/0254677 A1* | 11/2007 | Venkitaraman et al. | 455/458 |
| 2008/0075184 A1 | 3/2008 | Muharemovic et al. | |
| 2008/0219238 A1* | 9/2008 | Das | 370/351 |
| 2008/0256220 A1* | 10/2008 | Bachmann et al. | 709/222 |
| 2008/0285518 A1* | 11/2008 | Dutta et al. | 370/331 |
| 2009/0016304 A1* | 1/2009 | Aust et al. | 370/332 |
| 2009/0245421 A1 | 10/2009 | Montojo et al. | |
| 2010/0182911 A1 | 7/2010 | Pullen et al. | |
| 2010/0246532 A1* | 9/2010 | Olvera-Hernandez et al. | 370/331 |
| 2011/0032824 A1* | 2/2011 | Eyuboglu et al. | 370/237 |
| 2011/0145584 A1 | 6/2011 | Coburn et al. | |

OTHER PUBLICATIONS

Gundavelli et al., Proxy Mobile IPv6, draft-ietf-netlmm-proxymip6-00.txt, The IETF Trust, Apr. 8, 2007.*

International Search Report—PCT/US08-067211, International Sesarching Authority—European Patent Office, Mar. 12, 2009.

Written Opinion—PCT/US08-067211, International Searching Authority—European Patent Office, Mar. 12, 2009.

M Miyoshi et al.,"Performance Improvement of TCP in wireless cellular network based acknowledgement control", Department of Infomatics and Mathematical Secience, Gradute School of Engineering Science, Osaka University, Japan, Proceedings of the 7th Asia Pacific, pp. 1-15, 2001.

Miller et al., "Cumulative acknowledgement multicast repetition policy for wirless LANs or ad hoc network clusters" IEEE, Wireless Communication Technologies Group National Institute of Standards and Technology, Maryland Gaithersburg, pp. 3403-3407, 2002.

V. Dorot, F. Novikov, "Glossary of modern computer lexis", 3rd edition, Saint Petersburg, "BHV-Petersburg", 2004, p. 394.

Devarapalli V., et al., "Proxy Mobile IPv6 and Mobile IPv6 interworking draft-devarapalli-netlmm-pmipv6-mipv6-01", Netlmm Working Group, Apr. 25, 2007.

Taiwan Search Report—TW097122754—TIPO—Feb. 15, 2012.

* cited by examiner

MULTIPLE BINDINGS HAVING INDEPENDENT FORWARD AND REVERSE LINK BINDINGS FOR MOBILE INTERNET PROTOCOLS

CLAIM OF PRIORITY UNDER 35 U.S.C. §119

The present Application for Patent claims priority to Provisional Application No. 60/944,777, entitled MULTIPLE BINDING FOR PMIP FOR WIRELESS NETWORKS, filed Jun. 18, 2007 and assigned to the assignee hereof and hereby expressly incorporated by reference herein.

BACKGROUND

1. Field

The described aspects relate to wireless networks, and more particularly, to apparatus, methods and systems for multiple bindings having independent forward and reverse link bindings for Mobile Internet Protocols (MIP).

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Mobile Internet Protocol is an Internet Engineering Task Force (IETF) standard communications protocol that is designed to allow mobile device users to move from one network to another while maintaining a permanent IP address. As such, MIP serves to allow an access terminal/mobile device to register on foreign networks and connect back to their home network via a combination of a Foreign Agent (FA) and a Home Agent (HA). The HA is responsible for routing data to access terminals currently attached to a foreign network. This is achieved through a tunneling process in which Care-of-Address (CoA) is used to deliver the data to the access terminal. The CoA may be associated with a foreign agent, in which case it is termed FA CoA, or, it may be a co-located CoA meaning the access terminal is allocated an IP address in the foreign network.

Thus, in Mobile IP as the access terminal/mobile device moves from one attachment point, such as a base station or the like, to another attachment point the connection attachment point IP address may change. If the IP address does change, the access terminal sends a binding update to a HA to inform the home agent of the current IP address that is being used by the access terminal. As the access terminal moves from attachment point to attachment point the data packets destined for the access terminal will be routed to the HA first, which, based on the previous binding update, knows which address to send the data packets to. This procedure is transparent to any device which communicating with the access terminal, as only the HA requires knowledge of the access terminal's current IP address.

Applications for Mobile IP such as WiMAX and CDMA2000 networks use a technique termed Proxy MIP (PMIP). In Ultra Mobile Broadband (UMB), PMIP introduces an access gateway (AGW) into the Mobile IP architecture which interacts with the HA on behalf of the access terminal. In PMIP, as the access terminal moves from one attachment point (e.g., a source base station) to another attachment point (e.g. a target base station), instead of the access terminal sending the binding update to the AGW, as is the case in MIP, the target base station acts as a proxy and sends the binding update to the AGW on behalf of the access terminal. The binding update serves to prove to the HA that the entity that performs binding is either the user of the access terminal or a legitimate proxy of the user of the access terminal.

However, in MIP and PMIP, the access terminal is only using one attachment point at any point in time to communicate data. Thus, either the source base station or the target base station is being used by the access terminal at any point in time but not both. In other words, either the source base station or target base station is responsible for sending data to the access terminal on the forward link or receiving data from devices in communication with the access terminal on the reverse link. It should also be noted that after the binding update has been accomplished, the HA/AGW will drop all packets associated with the previous binding even though there may be in-flight packets from the source base station to the HA/AGW.

Recently MONAMI (MObile Nodes And Multiple Interfaces) working group has devised a multiple binding scheme extension for Mobile IP. In the generic concept devised by MONAMI and applied to MIP any base station can send uplink data on the reverse link. Additionally, the MONAMI concepts rely on multiple bindings for the same IP address in which each binding is assigned a weight (i.e., a preference for using the binding compared to other bindings). In the MONAMI concepts any base station can send uplink data on the reverse link but only the base station with the highest weight will receive downlink data on the forward link to send to the access terminal. During the binding process the access terminal communicates binding weights to the HA and based on the binding weights the HA forwards data traffic to the binding with the highest weight. In this regard the data traffic does not flow directly from a target base station when an access terminal moves to a new attachment point/base station because a new binding at the target base station has to be assigned a weight that is higher than the previous one assigned. If the weight assigned to the new attachment point is not higher then the HA will not direct forward link data to the new attachment point. The weighting scheme employed be the MONAMI concepts is unsuitable for this application of moving the data attachment point to the current base station while maintaining the data reception on the reverse direction because while higher weights are required to establish a new forward link, the weight assigned to any one base station cannot increase perpetually.

Additionally, in the MONAMI multiple binding scheme the binding of the forward link and the reverse link are dependent upon one another, i.e., the binding of the forward link affects the reverse link and vice versa. This is because in the MONAMI multiple binding scheme reverse link and forward link are not specified and, therefore, all bindings can receive both reverse link data and forward link data at any time based on the weight of the binding. For example, in a first binding has a weight of 5 and a second binding has a higher weight of 6, the first binding can send reverse link data but will not receive forward link data. However, if all the other bindings have weights less than 5, then the first binding will receive forward link data and send reverse link data. Thus, in the MONAMI multiple binding scheme whether a binding can send forward link data is dependent upon the state of the other bindings.

Therefore a need exists to develop a multiple binding scheme for MIP and derivatives, such as PMIP or the like, that allows for data to be communicated across more than one binding at any point in time and, in particular, allows for multiple base stations to send reverse link data independently of base stations receiving forward link data.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, apparatus, systems and computer program products are provided for multiple bindings in a Mobile Internet Protocol (MIP) network environment. The multiple bindings that are established are independent of one another, such that a forward link binding is decoupled from, or otherwise does not affect, a reverse link binding and vice versa. According to one aspect, multiple reverse link-only bindings may be established within an active route set for an access terminal. Additionally, according to certain aspects, a single primary binding may be established that allows forward link binding and reverse link binding. At any point in time, only one primary binding may be maintained per associated access terminal. Depending on the architecture, the binding may be generated either by the access terminal or by the base station.

According to one aspect, a method is defined for establishing multiple Mobile Internet Protocol (MIP) bindings. The method includes setting up a reverse link-only binding with a first network entity and setting up a forward link binding with a second network entity. The reverse link-only binding is set up independent of the forward link binding. The method additionally includes transmitting data on the reverse link through the first network entity and receiving data forward link data transmitted through the second network entity.

In one optional aspect of the method setting up the reverse link-only binding may further include setting up a plurality of reverse link-only bindings with a corresponding plurality of network entities. In such aspects, transmitting data on the reverse link may further include transmitting communication on any one of the plurality of reverse link-only bindings to the corresponding network entity.

In another optional aspect of the method setting up the reverse link-only binding further includes communicating a binding request from an access terminal to the first network entity and, in response to receipt of the binding request by the first network entity, communicating, from the first network entity to an binding registration entity, a registration request that includes a reverse link-only extension. The reverse link-only extension serves to identify the registration request as applicable to a reverse link-only binding. The binding registration entity may be a Home Agent (HA), an Access GateWay (AGW) or the like.

In yet another optional aspect of the method setting up the forward link binding may further include maintaining only one forward link binding per associated access terminal at any point in time. In this regard, the forward link binding may be moved to another base station but may not have multiple forward link bindings maintained at any one point in time.

According to another alternate aspect of the method setting up the forward link binding may further include setting up a primary binding with the second network entity that includes the forward link binding and a reverse link binding. In such aspects, setting up the primary binding may further include determining a quality measurement of one or more links and selecting a link for the primary binding based on the quality measurement.

Additionally the forward link/primary binding may be moved to another network entity and, therefore, the method may optionally include moving the primary binding to a third network entity. In such aspects, moving the primary binding to a third network entity may further include determining that a quality of a link to the third network entity is preferred over a quality of a link to the second network entity. Additionally, moving the primary binding to a third network entity may further include communicating a primary binding move request to the third network entity and, in response to receipt of the primary binding move request by the third network entity, generating and communicating, from the third network entity to a binding registration entity, a registration request absent a reverse link-only extension. The absence of a reverse link-only extension indicates that the registration is a primary binding move request.

In one aspect the method may further include setting up a signaling-only binding with a third network entity, such as a HA, AGW or the like. In such aspects, once the signaling-only binding has been set up, the method may further include discontinuing forwarding data from the third network entity to the signaling-only binding initiation entity, such as the access terminal, base station or the like. Additionally the method may include removing all primary bindings and other signaling bindings and notifying the signaling-only binding initiation entity when data becomes available.

In one aspect of the method establishing multiple MIP bindings is further defined as establishing multiple Proxy Mobile Internet Protocol (PMIP) bindings. In such aspects of the method, setting up the reverse link-only binding may further include setting up the reverse-link-only binding between a foreign agent, such as a base station or the like and the first network entity and setting up the forward link binding may further include setting up the forward link binding between the foreign agent and the second network entity.

At least one processor configured to establish multiple Mobile Internet Protocol (MIP) bindings defines another aspect of the innovation. The processor includes a first module for setting up a reverse link-only binding with a first network entity and a second module for setting up a forward link binding with a second network entity. The reverse link-only binding is set up independent of the forward link binding. The processor additionally includes a third module for transmitting data on the reverse link to the first network entity and a fourth module for receiving forward link data transmitted through the second network entity.

A computer program product that includes a computer-readable medium provides for another related aspect. The computer-readable medium includes a first set of codes for causing a computer to set up a reverse link-only binding with a first network entity and a second set of codes for causing the computer to set up a forward link binding with a second network entity. The reverse link-only binding is set up independent of the forward link binding. The computer-readable medium additionally includes a third set of codes for causing the computer to transmit data on the reverse link to the first network entity and a fourth set of codes for causing the computer to receive forward link data transmitted through the second base station.

Yet another related aspect is provided for by an apparatus that includes means for setting up a reverse link-only binding with a first network entity and means for setting up a forward link binding with a second base station that is exclusive of the first network entity. The apparatus additionally includes means for transmitting data on the reverse link to the first network entity and means for receiving forward link data transmitted through the second network entity.

A wireless access terminal defines another aspect of the innovation. The apparatus includes a computer platform including a processor and a memory in communication with a processor. The apparatus additionally includes a link binding module stored in the memory and in communication with the processor. The link binding module is operable to set up a reverse link-only binding with a first network entity and a forward link binding with a second network entity. The reverse link-only binding is set up independent of the forward link binding. The apparatus also includes a communication module in communication with the processor that is operable to transmit data on the reverse link to the first network entity and receive forward link data transmitted through the second network entity.

In one optional aspect of the apparatus, the link binding module may be further operable to set up a plurality of reverse link-only bindings with a corresponding plurality of network entities. In such aspect, the communication module may be further operable to transmit data on any one of the plurality of reverse link-only bindings to the corresponding network entity.

In other alternate aspects of the apparatus, the link binding module may be further operable generate a binding request that is communicated to the first network entity. The binding request is operable to request an additional reverse link-only be added to the active route set for the access terminal.

In another optional aspect of the apparatus, the link binding module is further operable to maintain only one forward link binding for the access terminal at any point in time. As such, the forward link binding can be moved to another network entity but no more than one forward link binding can be maintained at any point in time.

Yet another alternate aspect of the apparatus defines the link binding module as being further operable to set up a primary binding with the second network entity that includes the forward link binding and a reverse link binding. In such aspects, the apparatus may further include a link quality assessment module stored in the memory and in communication with the processor, wherein the link quality assessment module is further operable to determine a quality measurement of one or more links and select a link for the primary binding based on the quality measurement.

In another aspect of the apparatus, the link binding module may be further operable to set up a signaling-only binding with a third network entity, such as a HA, AGW or the like. The signaling-only binding is operable to discontinue forward of data from the third network entity to the access terminal, remove all primary bindings and other signaling bindings and notify the access terminal when data is available.

Another aspect of the innovation is defined by a method for providing multiple Mobile Internet Protocol (MIP) bindings. The method includes receiving at a first network entity a forward link binding request sent from a binding-initiating entity and receiving at a second network entity a reverse link-only binding request sent from the binding-initiating entity. The method further includes establishing a forward link binding for an access terminal with the first network entity based on receipt of the forward link binding request and establishing a reverse link-only binding for the access terminal with the second network entity based on receipt of the reverse link binding request. The reverse link-only binding is established independent of the forward link binding.

In one alternate aspect of the method, receiving at a second network entity may further include receiving at a plurality of second network entities reverse-only binding requests sent from the binding-initiating entity. In such aspects, establishing the reverse link-only binding may further include establishing a plurality of reverse link-only bindings with each of the corresponding plurality of second network entities.

In yet another optional aspect of the method, establishing the forward link binding with the first network entity may further include generating at the first network entity a registration request that includes a reverse link-only extension and communicating the registration request to a binding registration entity, such as a HA, AGW or the like.

In another alternate aspect of the method, establishing a forward link binding may further include maintaining the forward link binding as the only forward link for the access terminal.

Additionally, establishing a forward link binding may further include establishing a primary binding for the access terminal with the second network entity. The primary binding includes the forward link binding and a reverse link binding. In such aspects, the method may additionally include receiving at a third network entity a primary binding move request sent from the binding-initiating entity and generating at the third network entity a registration request that is absent a reverse link-only extension and communicating the registration request to a binding registration entity, such as a HA, AGW or the like.

A further aspect of the innovation is provided for by at least one processor configured to provide multiple Mobile Internet Protocol (MIP) bindings. The processor includes a first module for receiving at a first network entity a forward link binding request sent from a binding initiating entity and a second module for receiving at a second network entity, which is exclusive of the first network entity, a reverse link-only binding request sent from the binding-initiating entity. The processor additionally includes a third module for establishing a forward link binding for an access terminal with the first network entity based on receipt of the forward link binding request and a fourth module for establishing a reverse link-only binding for the access terminal with the second network entity based on receipt of the reverse link binding request. The reverse link-only binding is established independent of the forward link binding.

A computer program product that includes a computer-readable medium provides for another aspect. The computer-readable medium includes a first set of codes for causing a computer to receive at a first network entity a forward link binding request sent from a binding-initiating entity and a second set of codes for causing the computer to receive at a second network entity, a reverse link-only binding request sent from the binding initiating entity. The medium additionally includes a third set of codes for causing the computer to establish a forward link binding for an access terminal with the first network entity based on receipt of the forward link binding request and a fourth set of codes for causing the computer to establish a reverse link-only binding for the access terminal with the second network entity based on receipt of the reverse link binding request. The reverse link-only binding is established independent of the forward link binding.

An apparatus defines yet another aspect of the innovation. The apparatus includes means for receiving at a first network entity a forward link binding request sent from a binding initiating entity and means for receiving at a second network entity a reverse link-only binding request sent from the binding initiating entity. The apparatus additionally includes means for establishing a forward link binding for an access terminal with the first network entity based on receipt of the forward link binding request and means for establishing a reverse link-only binding for the access terminal with the second network entity based on receipt of the reverse link binding request. The reverse link-only binding is established independent of the forward link binding.

A further aspect is defined by a network system that includes a first network entity and a second network entity. The first network entity is operable to receive a forward link binding request sent from a binding initiating entity and establish a forward link binding for an access terminal with the first network entity based on receipt of the forward link binding request. The second network entity is operable to receive at a second network entity a reverse link-only binding request sent from the binding-initiating entity and establish a reverse link-only binding for the access terminal with the second network entity based on receipt of the reverse link binding request. The reverse link-only binding is established independent of the forward link binding.

In one optional aspect of the system, the second network entity may further include a plurality of second network entities operable to receive reverse-only binding requests sent from the binding initiating entity and establish a plurality of reverse link-only bindings with each of the corresponding plurality of second network entities.

In another aspect the system may further include an a binding registration entity that is operable to receive, from the second network entity, a registration request that includes a reverse link-only extension and to register the second network entity as a reverse link-only binding for the access terminal.

In yet a further alternate aspect of the system, first network entity may be further operable to maintain the forward link binding as the only forward link for the access terminal until the forward link binding is moved. Additionally, the first network entity may be further operable to receive a primary link binding request sent from the binding initiating entity and establish a primary binding for the access terminal with the second network entity. The primary binding includes the forward link binding and a reverse link binding. In yet further alternate aspects the system may include a third base station, that is exclusive from the second network entity, that is operable to receive a primary binding move request sent from the access terminal and establish a primary binding for the access terminal with the third base station. In such aspects, the system may include a binding registration entity that is operable to receive, from the third base station, a registration request absent a reverse link-only extension and to register the third base station as the primary binding for the access terminal.

Thus, presents aspects herein described and claimed provide for multiple bindings having independent forward and reverse links in a MIP network environment. By having forward and reverse link bindings that are independent of each other, establishment of one link binding does not affect the establishing or maintaining another link binding. According to one aspect, multiple bindings include multiple reverse link-only bindings that are capable of receiving uplink communication packets and a single forward link binding that is operable to send downlink communication packets. Additionally, according to other aspects, a single primary binding may be established that provides for the only forward link binding and reverse link binding.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote the elements, and in which.

DETAILED DESCRIPTION

Figure 1:
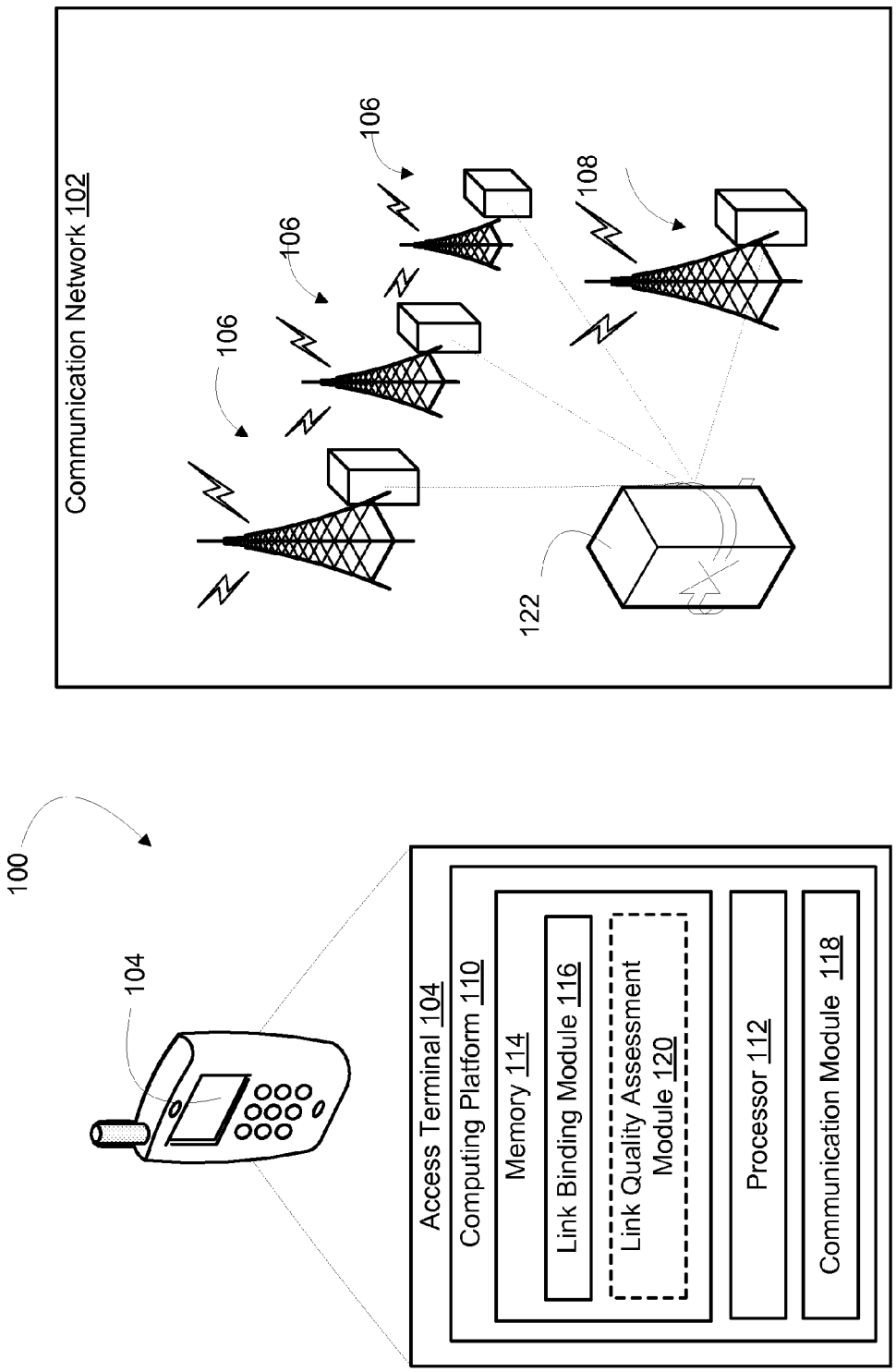
FIG. 1 is a block diagram of a system for providing multiple bindings for Mobile Internet Protocol (MIP), according to an aspect.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are descried in the context of determining characteristics of one or more wireless channels and providing a handover determination based in part on magnitudes of the determined characteristics. One skilled in the art should appreciate that similar techniques could apply to other communication environments.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

According to present aspects, methods, apparatus, systems and computer-program products are defined for multiple bindings and, in particular independent forward and reverse link bindings in a Mobile Internet Protocol (MIP) network environment. In one aspect, the multiple MIP bindings may be further defined as multiple Proxy Mobile Internet Protocol (PMIP) bindings. In certain aspects, the multiple independent bindings provide for multiple reverse link-only bindings and a single forward link binding, generally a primary binding that allows for a forward link and a reverse link.

As will be discussed with reference to the figures infra., the MIP multiple bindings are performed between network entities, such as base stations, in some instances enhanced Base Stations (eBS), in the active route set of a wireless Access Terminal (AT) and a binding registration entity, such as a Home Agent (HA) or an Access GateWay (AGW) to allow for direct tunneling of reverse link packets from the network entities in the active route set to the binding registration entity without traversing the forward link, otherwise referred to as the primary link or the Data Attachment Point (DAP). Once the binding registration entity receives a registration request from a network entity that indicates a reverse link-only binding request, the binding registration entity can receive the reverse link packets from this network entity and the binding registration entity does not send forward link packets to this network entity. Conversely, if the binding registration entity receives a standard registration request that does not indicate reverse link-only binding, the binding registration entity can receive the reverse link packets from this network entity and the binding registration entity can send forward link packets to this network entity. In this regard, present aspects provide for multiple base stations to send reverse link data to the binding registration entity by utilizing multiple bindings at the binding registration entity.

FIG. 1 depicts a block diagram of a system 100 for establishing multiple link bindings in a communication network 102, such as an Ultra Mobile Broadband (UMB) network or any other network relying on Mobile Internet Protocol (MIP) for data transmission and/or signaling transmission. The system includes a wireless Access Terminal (AT) 104 that is in wireless communication with communication network 102. The communication network 102 includes one or more network entities, such as first Base Stations (BSs) 106 and second Base Station (BS) 108. In the UMB network architecture, BS 106 and BS 108 may further be defined as enhanced-Base Stations (eBS).

AT 104 includes a computing platform 110 having at least one processor 112 and a memory 114 in communication with the processor 112. The memory 114 of AT 102 includes a link binding module 116 that is operable to set up link bindings with the base stations in communication network 102. Specifically, link binding module 116 is operable to set up one or more, and in most aspects, a plurality of reverse link-only binding with a corresponding first base station 106, such that the reverse link-only binding limits communication to upstream data and/or signaling. Multiple reverse link-only bindings provide for multiple base stations to send upstream data to AT 104 at the same time or proximate to the same time. Additionally, link binding module 116 is operable to set up a forward link binding with a corresponding second base station 108, such that the forward link binding provides communication to upstream data.

It should be noted that reverse link bindings and the forward link binding are decoupled from each other, otherwise referred to herein as being independent of each other, such that the a forward-link binding does not affect or otherwise change reverse link-bindings and reverse link bindings do not affect or otherwise change the forward link binding. As such, the base station that forms the link binding controls the link and is not dependent on the other binding states that exist between AT 104 and BSs 106 and/or 108.

The multiple bindings associated with AT 104 form an active route set of base stations that are capable of communicating with AT 104 at any given point in time. The active route set remains dynamic as the AT 104 moves from one geographic location to another geographic location.

In one aspect, the link binding module 116 is further operable to set up a primary link binding, otherwise referred to as a Data Attachment Point (DAP), with any one base station. The primary link binding includes the forward link binding and a reverse-link binding. Thus, the primary link binding is capable of receiving forward link communication and sending reverse link communication. In accordance with present aspects, at any point in time, AT 104 may maintain only one forward link binding and, as such, AT 104 may maintain only one primary link binding, since the primary link binding includes a forward link binding.

In one aspect, the reverse link-only bindings may be set up by sending a route request message to the targeted BS 106 and, in turn, generating a registration request at the BS 106, which is communicated to a binding registration entity, such as Access GateWay (AGW) 122. The registration request includes a reverse link-only extension/identifier that serves to establish the binding link as a reverse link-only binding. The forward link/primary binding may be set by sending a route request to the targeted BS 108 and, in turn, generating a registration request at BS 108, which is communicated to AGW 122. The absence of a reverse link-only extension/identifier in the registration request indicates that the request is for setting up a forward link/primary link or the movement (i.e., re-setting) of the primary link from one BS to another BS.

AT 104 additionally includes a communication module in communication with the processor 112 and operable to transmit communication on the reverse link(s) to the first base stations 106 and receive communication on the forward link from the second base station 108.

Additionally, the memory 114 of AT 104 may include a link quality assessment module 120 that is operable to determine a quality measurement for links. The quality measurement, such as pilot signal strength and/or the like may be used to determine which links to add and/or delete to the active route set of link bindings and to determine when a primary binding should be moved or re-set to another base station in the active route set. In alternate aspects, the functionality of the link quality assessment module may be performed by a network entity.

Figure 2:
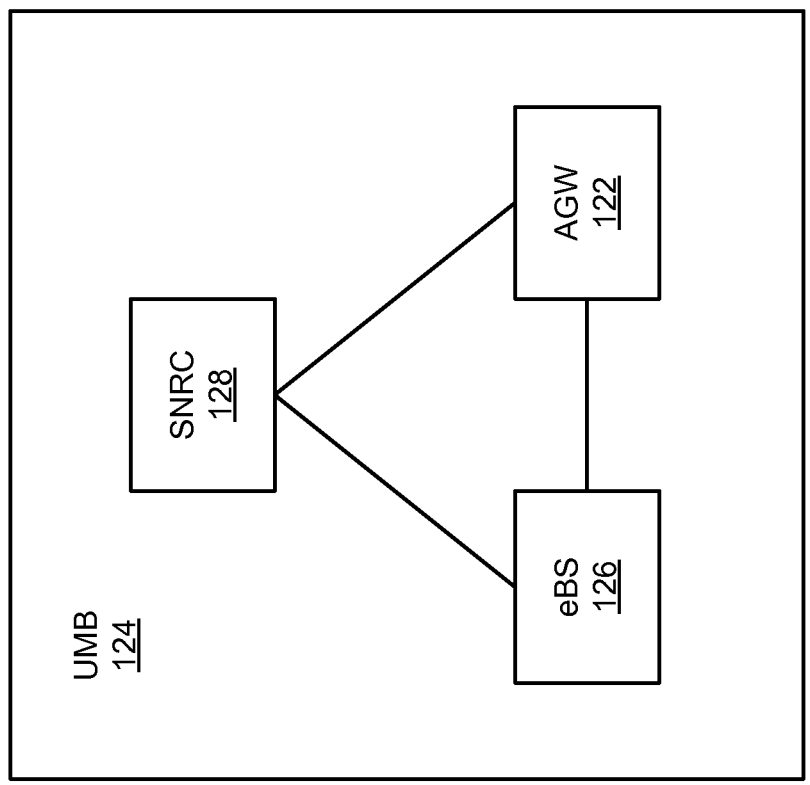
FIG. 2 is a block diagram of an Ultra Mobile Broadband (UMB) network, which may be implement in conjunction with aspects of the present innovation.
Figure 2:
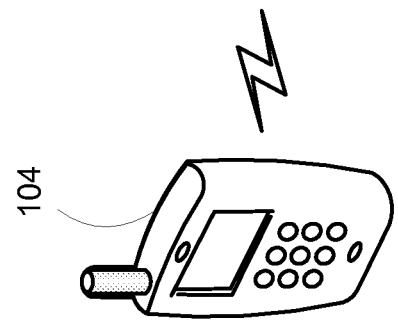

FIG. 2 depicts a block diagram illustration of an Ultra Mobile Broadband (UMB) network 124 architecture, which may be implemented in conjunction with various aspects herein described. The UMB network 124 includes network entities, such as enhanced Base Station (eBS) 126 (such as first BS 106 or second BS 108 depicted in FIG. 1), Session Reference Network Controller (SRNC) 128 and binding registration entities, such as Access Gateway 122. The UMB network 124 provides IP data connectivity to Access Terminal (AT) 104, which is the subscriber device, such as a mobile telephone, Personal Data Assistant, mobile-enabled laptop computer or the like.

The eBS 126 provides over-the-air (OTA) signaling and user-data transport that is used by the AT 104 for connectivity to the radio access network. Additionally, eBS 126 provides a layer 2 attachment point for the AT 104, and, according to present aspects, may act as a layer 1 attachment point for reverse links and/or forward links. eBS 126 also provides, among other functions, encryption/decryption of packets at the radio-link protocol (RLP) level for OTA transmission/reception, scheduling for OTA transmission, header compression and the like.

Figure 3:
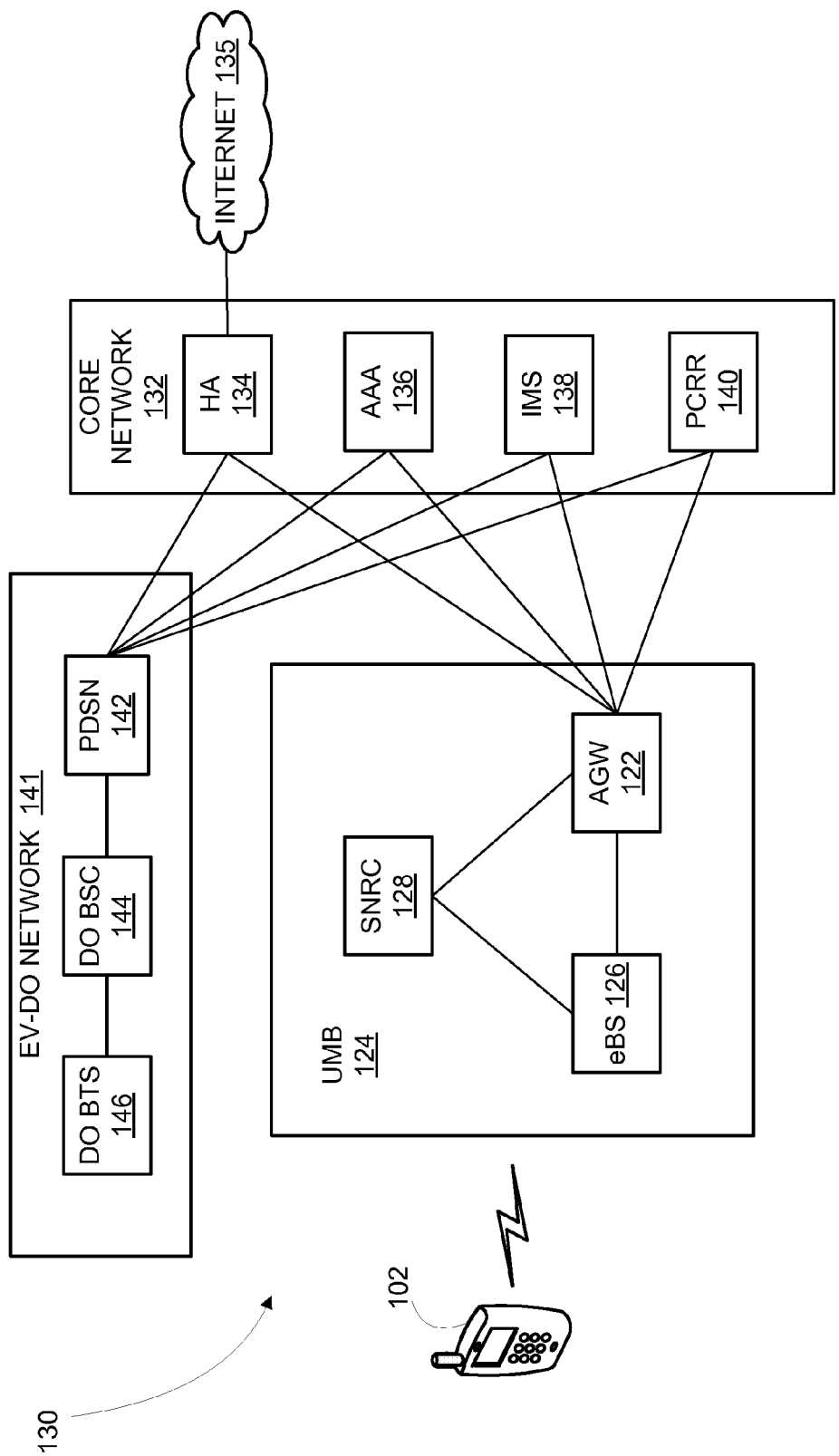
FIG. 3 is a block diagram of a UMB converged access network, depicting the connecting interfaces between the UMB and an Evolution-Data Optimized (EVO-DO) network, according to an aspect.

The SRNC 128 maintains radio-access-specific information for the AT in the Converged Access Network (CAN) (shown in FIG. 3). The SRNC 128 is responsible for maintaining the session reference (i.e., session storage point for negotiated air-interface context), supporting idle-state management, providing paging-control functions when the AT 104 is idle and the like. SNRC 128 may also be responsible for providing access authentication of the AT 104. The SRNC 128 may be included within an eBS or the SRNC 128 may be physically located in another device, such as a stand-alone SNRC device.

The AGW 122 provides the AT 104 a point of IP connectivity to the packet data network, i.e., the AGW 122 is the first-hop router for the AT 104. The AGW 122 is responsible for layer 3 services and higher layer functions, including, but not limited to, hot-lining, policy enforcement and the like.

Referring to FIG. 3, a block diagram is provided of an Ultra Mobile Broadband (UMB) converged access network 130, illustrating the connecting interfaces between the UMB network and an EVolution-Data Optimized (EV-DO) network. The UMB network 130 shown in FIG. 3 is identical to the network shown in FIG. 2. Hence, refer to the discussion of FIG. 2 for the description of the UMB network 130 and associated elements. The AGW 122 of UMB network 130 provides a point of IP attachment to the core network 132. The core network 132 includes, amongst other devices and entities, a Home Agent (HA) 134, an Authentication, Authorization and Accounting server 136, an IP Multimedia Subsystem (IMS) 138, a Policy and Changing Rules Router (PCRR) 140 and the like.

The HA 134 is used to provide a mobility solution (i.e., cell-to cell handoff) to the AT 104 in a 3GPP2 packet-data network. HA 134 provides connection to other networks, such as Internet 135 or the like. Additionally, in an evolved network, the HA 134 may provide inter-technology mobility (i.e., network-to-network handoff). The AAA server 136 provides for AT 104 user authentication and authorization, as well as, any accounting functions required for network sessions. The IMS 138 implemented in 3GPP, 3GPP2 networks and the like, includes functionality to define an all inclusive IP bases wireless network that includes voice, data, signaling and control network networks. The PCCR 140 includes policy and change rules functions that provide necessary rules to the AGW. The purpose of the rules are to detect a packet belonging to the service data flow, provide policy control for a serve data flow, provide applicable charging parameters for a service data flow and the like.

Each device and/or entity in the core network 132 provides connectivity to the EV-DO network 141 through Packet Data Switch Node 142. PDSN 142 is the node that provides a point of IP connectivity in the existing core network 132 or any other network, such as CDMA2000 1X or the like. Additionally, PDSN 142 provides connection to a Data Optimized Base Station Controller (DO BSC) 144 and the BSC 144 provides a point of connection to the Data Optimized Base Transceiver Station (DO BTS) 146.

Figure 4:
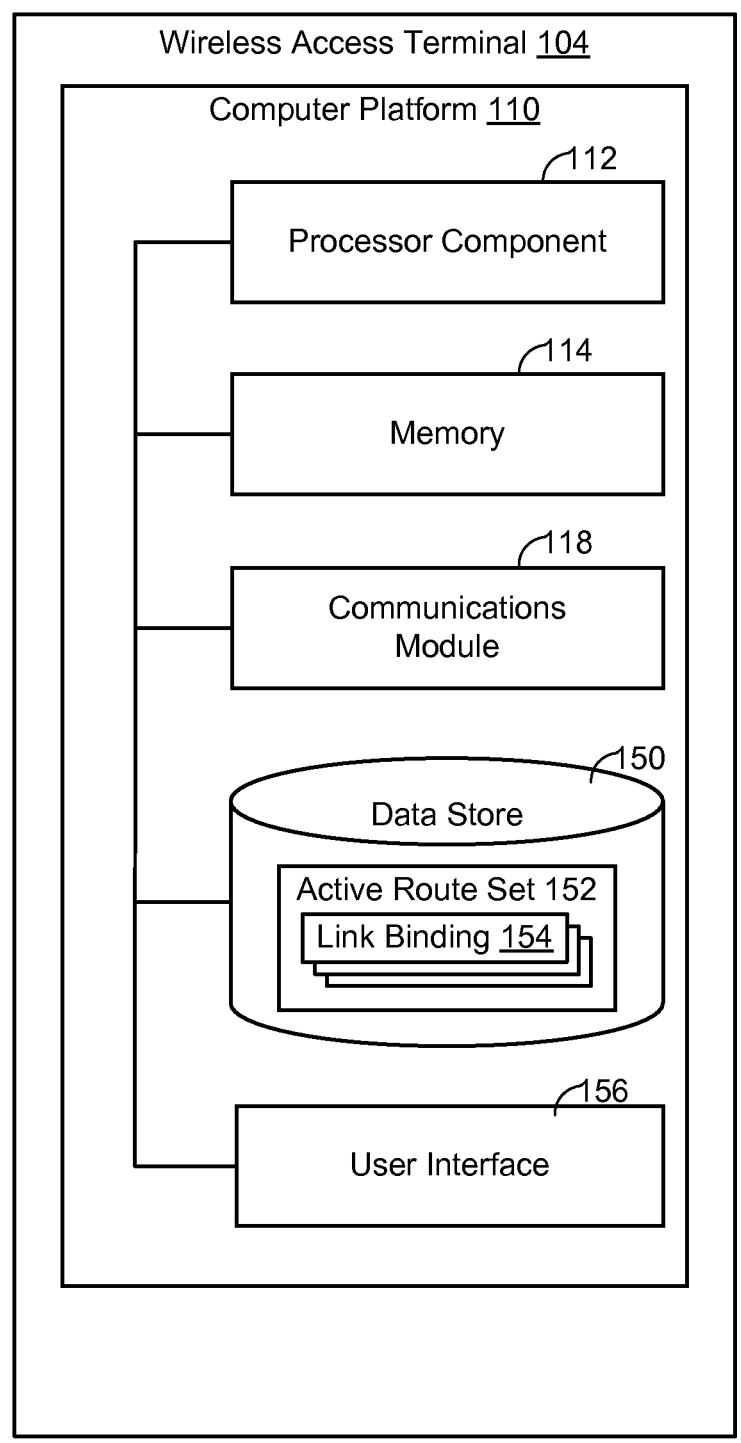
FIG. 4 is block diagram of an exemplary access terminal, according to another aspect.

Referring to FIG. 4, in one aspect, access terminal 104 comprises a mobile communication device, such as mobile telephone or the like, operable on a wireless communication system. As can be appreciated, there are a variety of wireless communication systems in addition to the UMB network, which often employ different spectrum bandwidths and/or different air interface technologies. Exemplary systems include CDMA (CDMA 2000, EV DO, WCDMA), OFDM, or OFDMA (Flash-OFDM, 802.20, WiMAX), FDMA/TDMA (GSM) systems using FDD or TDD licensed spectrums, peer-to-peer (e.g., mobile-to-mobile) ad hoc network systems often using unpaired unlicensed spectrums, and 802.xx wireless LAN or BLUETOOTH techniques.

As previously noted, access terminal 104 includes processor component 112 for carrying out processing functions associated with one or more of components and functions described herein. Processor component 112 can include a single or multiple sets of processors or multi-core processors. Moreover, processing component 112 can be implemented as an integrated processing system and/or a distributed processing system. Additionally, processing component 112 may include one or more processing subsystems, such as processing subsystems capable of determining link quality or setting up link bindings according to present aspects, or any other processing subsystem needed to carry out present aspects.

Access Terminal 104 further includes a memory 114, such as for storing local versions of applications/modules being executed by processor component 112. Memory 114 can include random access memory (RAM), read only memory (ROM), and a combination thereof. Additionally, in some aspects (not shown in FIG. 4), memory 114 includes link binding module 116, link quality assessment module 122 and the like.

Further, access terminal 104 includes a communications module 118 that provides for establishing and maintaining communications with one or more parties utilizing hardware, software, and services as described herein. Communications module 118 may carry communications between components on access terminal 104, as well as between access terminal 104 and external network devices, such as base stations 106, 108 and/or 126 located across a communications network and/or devices serially or locally connected to access terminal 104.

Additionally, access terminal 104 may further include a data store 150, which can be any suitable combination of hardware and/or software that provides for mass storage of information, databases, and programs employed in connection with aspects described herein. Optionally, in some aspects, data store 150 may serve to store the active route set 152, which includes the link bindings 154.

Access terminal 104 may additionally include a user interface component 156 operable to receive inputs from a user of access terminal 104, and to generate outputs for presentation to the user. User interface component 156 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 156 may include one or more output devices, including but not limited to a display, a speaker, a haptic feedback mechanism, a printer, any other mechanism capable of presenting an output to a user, or any combination thereof.

Figure 5:
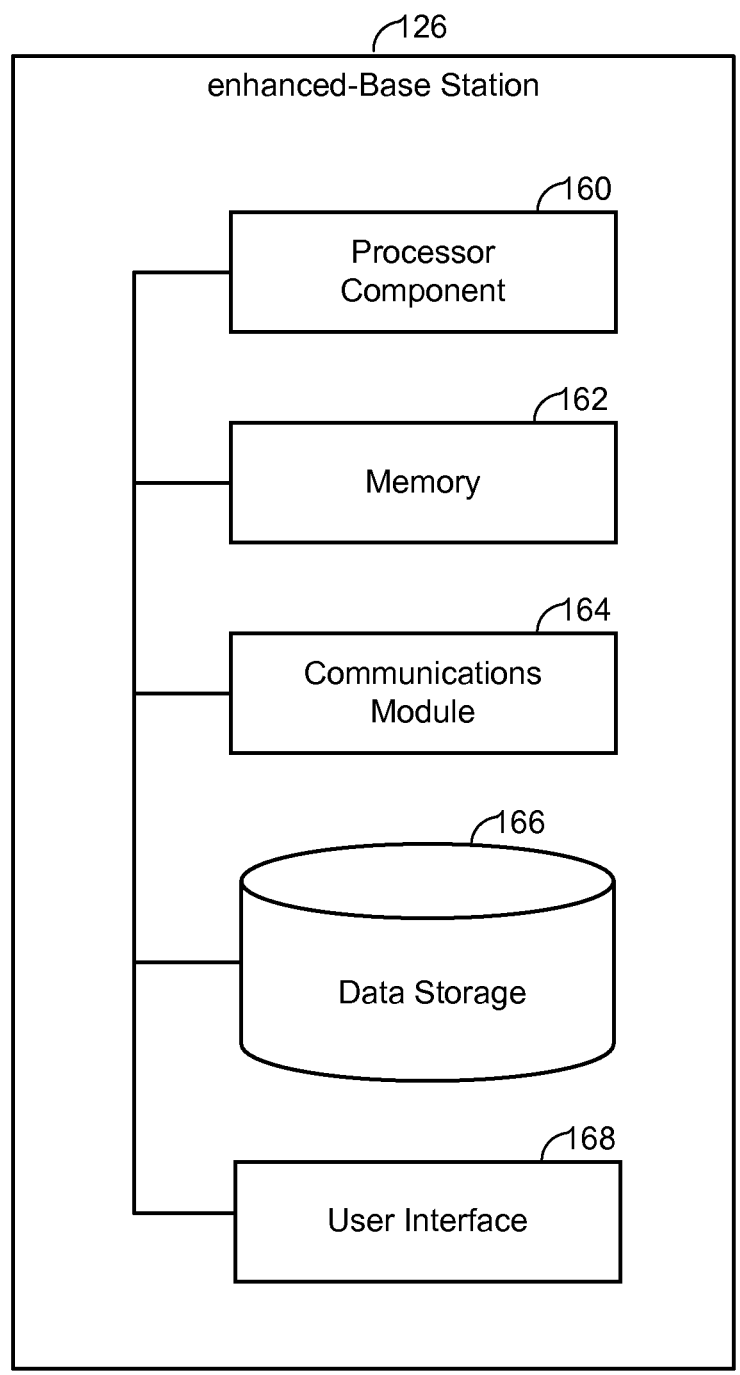
FIG. 5 is a block diagram of an exemplary enhanced Base Station (eBS), according to an aspect.

Referring to FIG. 5, in one aspect, a network entity, such as enhanced-Base Station 126 is operable to receive forward or reverse link binding requests and establish binding links at the base station with a binding registration entity, such as an AGW in accordance with the request. eBS 126 includes any type of network-based communication device, such as a network server operable on a communication network. Communication network may be a wired or wireless communication system, or a combination of both, and includes the wireless network on which access terminal 104 operates.

eBS 126 includes a processor component 160 for carrying out processing functions associated with one or more of components and functions described herein. Processor component 160 can include a single or multiple sets of processors or multi-core processors. Moreover, processor component 160 can be implemented as an integrated processing system and/or a distributed processing system.

eBS 126 further includes a memory 162, such as for storing local versions of applications being executed by processor component 160. Memory 162 may include random access memory (RAM), read only memory (ROM), and a combination thereof.

Further, eBS 126 includes a communications module 164 that provides for establishing and maintaining communications with one or more parties utilizing hardware, software, and services as described herein. Communications module 164 may carry communications between components on eBS 126, as well as between eBS 126 and external devices, such as access terminal 104, and including devices located across communications network and/or devices serially or locally connected to eBS 126. In one aspect, communications module 126 is operable for receiving link binding requests, and sending registration requests to the AGW.

Additionally, eBS 126 may further include storage devices 166, which can be any suitable combination of hardware and/or software that provides for mass storage of information, databases, and programs employed in connection with aspects described herein.

eBS 126 may additionally include a user interface component 168 operable to receive inputs from a user of eBS 126, and to generate outputs for presentation to the user. User interface component 168 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 168 may include one or more output devices, including but not limited to a display, a speaker, a haptic feedback mechanism, a printer, any other mechanism capable of presenting an output to a user, or any combination thereof.

Figure 6:
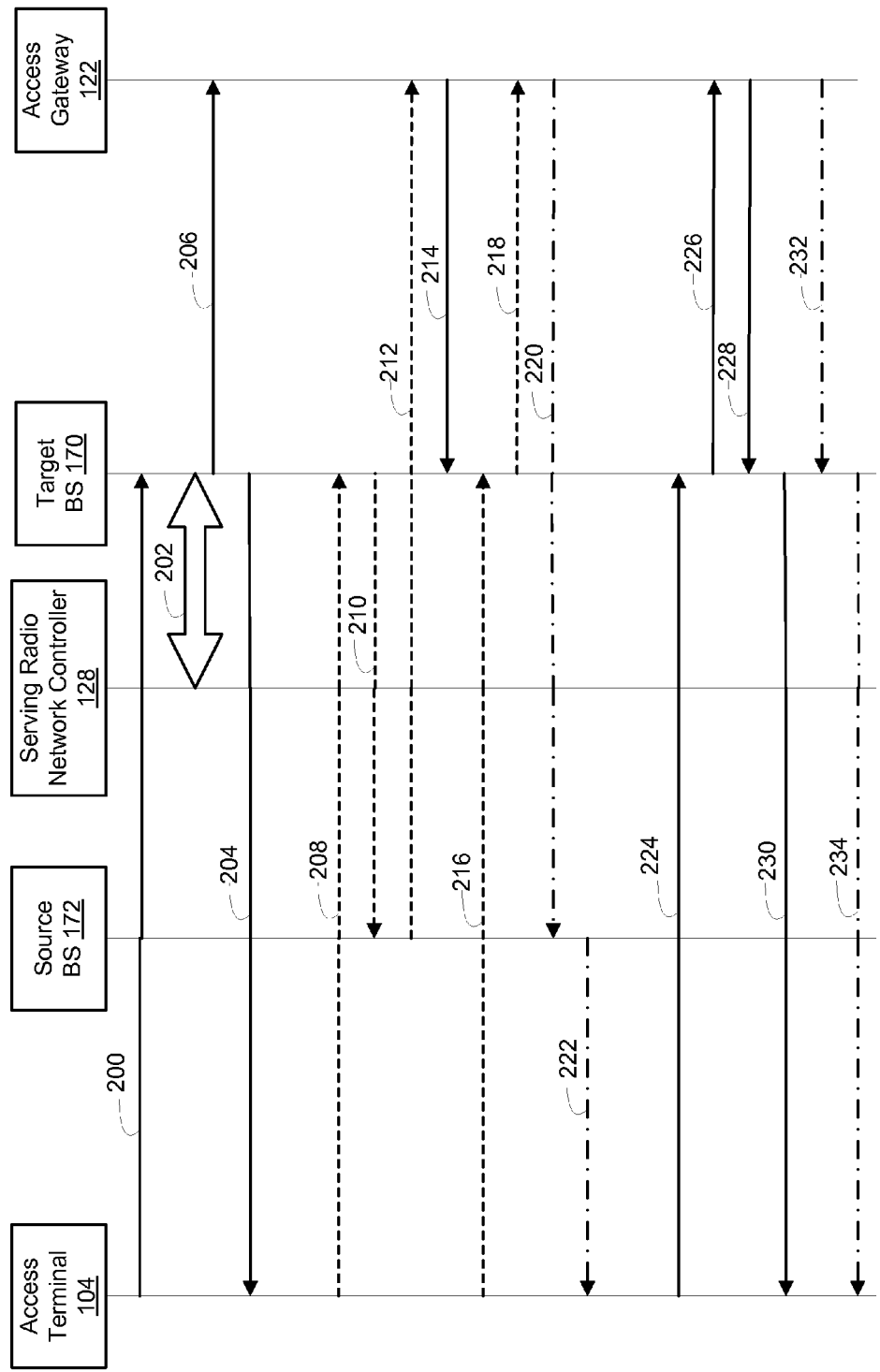
FIG. 6 is a call flow diagram for adding a binding to an active route set and primary binding movement, according to an aspect of the present innovation.

FIG. 6 depicts a call flow diagram for adding a binding to an active route set and primary binding movement (i.e., Data Attachment Point (DAP) movement) in a UMB network, according to aspect of the present innovation. It should be noted that the multiple binding scheme described herein is not limited to a UMB network and may be implemented in other networks that rely on Mobile Internet Protocols (MIPs) or the like. At Event 200, the Access Terminal (AT) 104, sends a route open request to a target eBS 170. The route open request informs the target eBS 170 that the AT 104 desires to add the eBS to the AT's active route set. The AT 104 will make the decision to add the target eBS 170 to the active route set based on one or more performance characteristics, such as pilot signal strength and the like. At Event 202, the target eBS 170 and Session Reference Network Controller (SRNC) exchange authentication information and the like. More detailed discussion of the authentication process is provided in relation to FIG. 8.

At Event 204, the target eBS 170 sends a route open accept to the AT 104 informing the AT that the target eBS 170 accepts the active route set assignment. Proximate the time at which the target eBS 170 sends the acceptance, at Event 206, target eBS 170 sends a registration request, such as PMIP Registration Request (PMIP RRQ) to the AGW 122. The PMIP RRQ includes a reverse link-only extension that serves to inform the AGW 122 that the eBS desires to have reverse link-only binding (i.e., upstream traffic only).

At Event 208, AT 104 may communicate reverse link data to the target eBS 170. However, since the target eBS 170 has yet to receive a registration response form AGW 122, at Event 210, target eBS 170 forwards the reverse link data to the primary binding/Data Attachment Point (DAP), which in this instance is the source eBS 172. In turn, at Event 212, source-eBS 172 communicates the reverse link data to the AGW 122.

At Event 214, AGW 122 generates and communicates a registration response, such as a PMIP Registration Response (RRP) to the target-eBS 170 confirming the reverse link binding for the AT 104. Once the reverse link binding has been confirmed at the target eBS 170, at Event 216, AT 104 sends reverse link data to target eBS 170 and, at Event 218, target eBS 170 forwards the reverse link data to AGW 122.

At Event 220, since the Access Terminal (AT) 104 has an existing primary binding with source enhanced-Base Station (eBS) 172, Access Gateway (AGW) 122 sends forward link data to source eBS 172 and, at Event 222, source eBS 172 communicates the forward link data to AT 104.

New network characteristics that may be based on movement of the AT 104 to a new geographic location may precipitate a new primary binding (i.e., a new base station assigned to receive forward link data). Thus, at Event 224, AT 104 sends a Data Attachment Point (DAP) move request to target eBS 170. The DAP move request indicates to the target eBS 170 that the AT 104 desires to assign primary binding to the target eBS. In turn, at Event 226, target eBS 170 sends a Proxy Mobile IP (PMIP) RRQ to AGW 122. Since the PMIP RRQ does not include a reverse link-only extension, AGW 122 moves the primary binding assignment to target eBS 170. At Event 228, AGW 122 sends a PMIP Registration Response (RRP) to the target eBS 170 that informs the target eBS 170 of their primary binding status. In turn, at Event 230, the target eBS 170, communicates the new primary binding/DAP assignment to the AT 104.

At Event 232, once the primary binding/DAP has been re-assigned to the target eBS 170, forward link data is communicated from AGW 122 to target eBS 170 and, at Event 234, the forward link data is communicated from the target eBS 170 to AT 104. At this point, the source eBS 172 is no longer the primary binding and moves to reverse link-only status, meaning source eBS 172 can no longer receive forward link data downstream but can only send reverse link data upstream.

Figure 7:
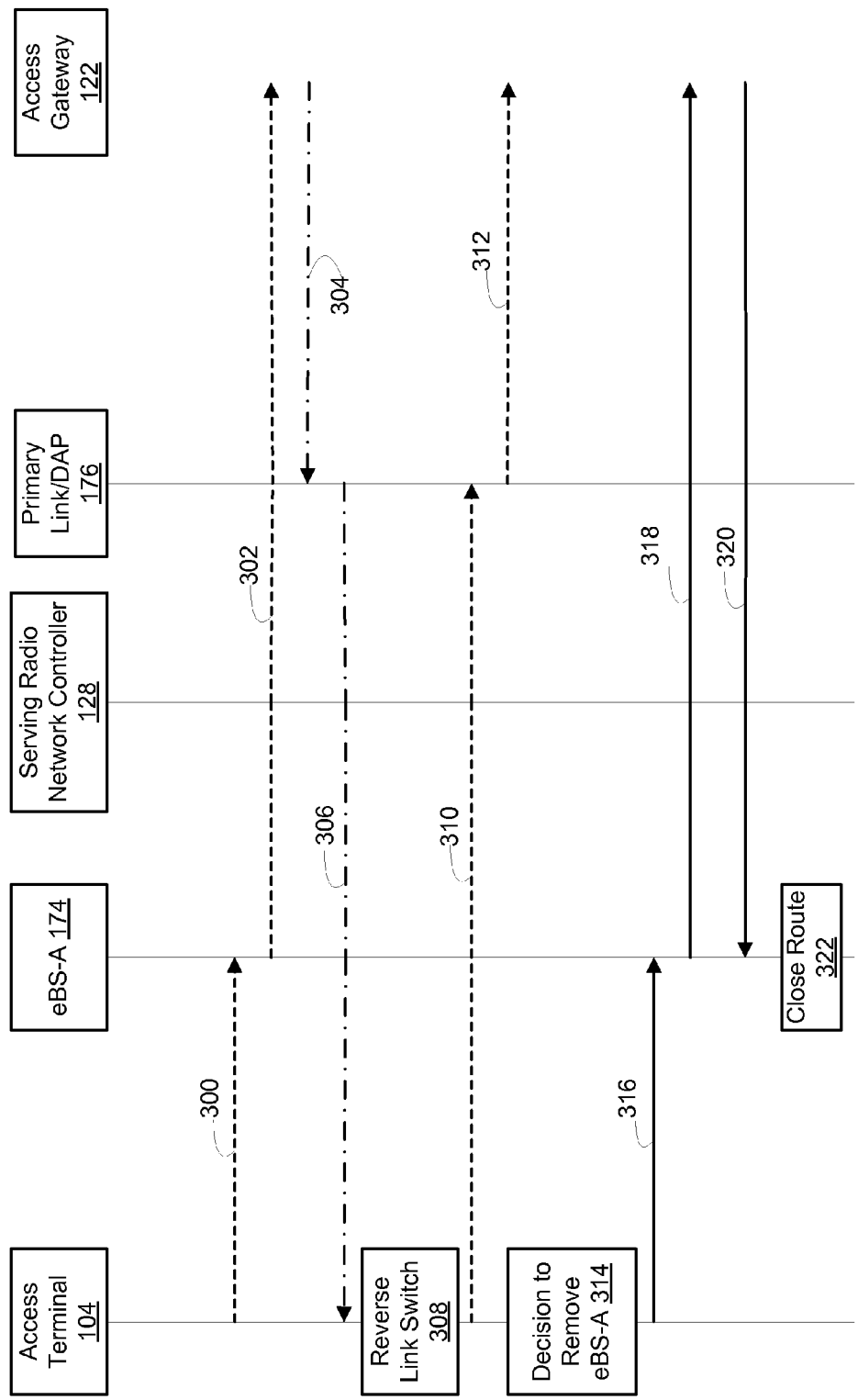
FIG. 7 is a call flow diagram for deletion of a binding in an active route set, according to an aspect of the innovation.

Referring to FIG. 7, a call flow diagram is presented that illustrates an example of a deletion of a binding in an active route set in a UMB network, according to an aspect of the innovation. In a current state, in which AT 104 includes eBS-A 174 in the active route set as a reverse link-only binding, at Event 300, AT 104 sends reverse link data to eBS-A 174. In turn, at Event 302, eBS-A 174 communicates the reverse link data to Access Gateway (AGW) 122.

At Event 304, AGW 122 communicates forward link data to the current primary binding/Data Attachment Point (DAP) 176 and, in turn, at Event 306, DAP 176 forwards the forward link data to AT 104.

At Event 308, based on load factors or the like, AT 104 determines to switch reverse link routes. As such, at Event 310, reverse link data is communicated to DAP 176 and, at Event 312, DAP 176 forwards the reverse link data to AGW 122.

At Event 314, AT 104 makes a determination to remove eBS-A 174 from the active route set. The decision to remove eBS-A 174 may be based on the BS failing to maintain minimal signal strength with the AT 104 or any other performance factor. Thus, at Event 316, AT 104 sends a route close request to eBS-A 174. In response to receipt of the route close request, at Event 318, eBS-A 174 generates and communicates a PMIP Registration Request (RRQ) to AGW 122. The PMIP RRQ includes a reverse link only indicator, such as a flag and a route close identifier, such as a lifetime flag set to zero or the like. Thus, the PMIP RRQ requests that eBS-A 174 be removed from the AT's active route set and the binding with the AGW 122 be closed. At Event 320, AGW 122 generates and communicates a PMIP RRP that confirms the removal of eBS-A 174 from the active route set and closes the binding between AGW 122 and eBS-A 174. Thus, at Event 322, eBS-A 174 closes the route between the AT 104 and the eBS-A 174.

Figure 8:
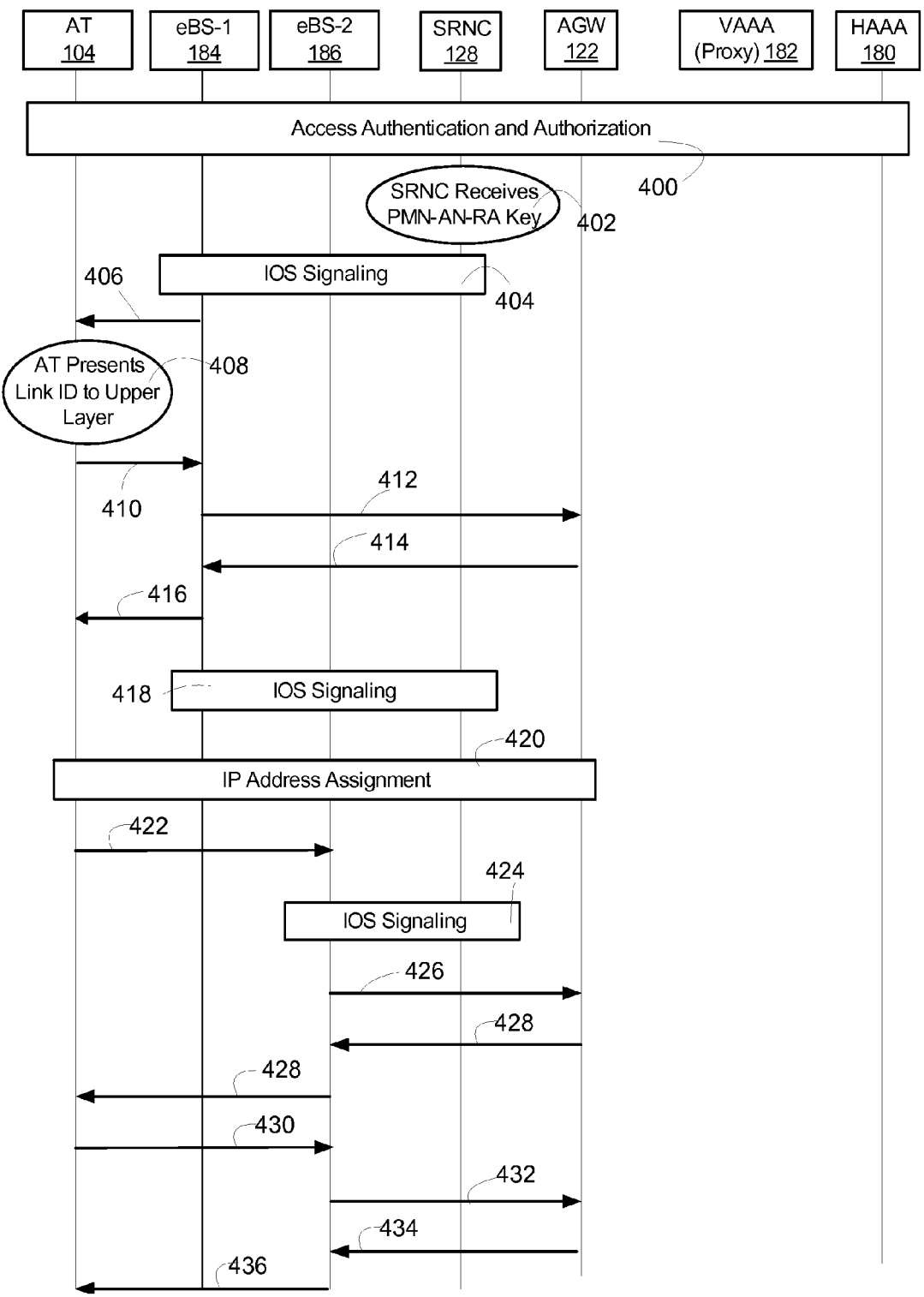
FIG. 8 is a call flow diagram that illustrates PMIP binding updates for initial power up, subsequent route adding and primary binding/DAP movement, according to aspects herein disclosed.

Referring to FIG. 8, a call flow diagram is presented that illustrates PMIP binding updates for initial power up, subsequent route adding and primary binding/DAP movement in a UMB network, according to aspects herein disclosed. If the AGW 122 receives the regular PMIP Registration Request without the reverse link-only extension, the AGW 122 can receive and send packets from and to this particular eBS. At Event 400, the Access Terminal (AT) 104 performs an access authentication and authorization process to gain access to the wireless network. During access authentication and authorization, the Access Gateway (AGW) 122 receives Permanent NAI (Network Address Identifier) and other parameters from the Home Authorization, Authentication and Accounting (HAAA) server 180. The Permanent_NAI is used by the AGW 122 and the Session Reference Network Controller (SRNC) 128 for user identification. Additionally, during access authentication and authorization, the AGW 122 generates a Proxy Mobile Node-Access Node Random Key (PMN-AN-RK) that is associated with the AT 122. At Event 402, the SNRC 128 receives the PMN-AN-RK and the Permanent_NAI from the AGW 122 and authenticates and authorizes the AT 104 accordingly. It should be noted that when enhanced-Base Station-1 (eBS-1) 108 is being added to the active route set (i.e., the set of base stations that the AT 104 may currently communicate with at any given time) eBS-1 184 does not send a PMIP binding to the AGW 122 during the access authentication and authorization process. This is because eBS-1 184 does not have requisite information, such as AGW IP Address, PMIP key and the like prior to the AT 104 being authenticated.

At Event 404, eBS-1 184, enhanced-Base Station-2 (eBS-2) 186 and SNRC 128 perform Inter-Operability Standard (IOS) signaling exchanges in which the SNRC 128 sends AGW ID, Permanent-NAI and the Proxy Mobile Node-Access Node Home Agent (PMN-AN-HA) key derived from PMN-AN-RK to eBS-1 184. Additionally, the nonce value that is used for generating the PMN-AN-HA key at the AGW 122 is also sent from the SRNC 128 to eBS-1 184.

At Event 406, eBS-1 184 sends the link ID to the AT 104. The link ID represents the IP interface that the AT 104 creates to communicate with the IP layer and, at Event 408, AT 104 presents the link ID to the IP layer. In turn, the upper IP layer compares the link ID with its current link ID and, if the link ID differs from the current link ID, IP Address assignment is triggered.

At Event 410, the AT 104 sends a Data Attachment Point (DAP) move request to eBS-1 184. Since eBS-1 184 does not have the Generic Routing Encapsulation (GRE) key, at Event 412, eBS-1 184 sends a PMIP Registration Request (RRQ) to the AGW 122. The PMIP RRQ includes eBS-1 IP address, Permanent NAI and the nonce received during the IOS signaling (Event 404). The PIMP RRQ additionally includes Mobile Node-Home Agent (MN-HA) authentication extension, which is generated by using the PMN-AN-HA key received during the IOS signaling (Event 404).

At Event 414, the AGW 122 sends a PMIP Registration Response (RRP) to eBS-1 184. Prior to sending the PMIP RRP, the AGW 122 verifies the MN-HA authentication extension by using the PMN-AN-HA key. If the authentication is successful, the AGW 122 selects a GRE key associated with the Permanent NAI and communicates the GRE key through GRE extension in the PMIP RRP. It should be noted that since the PMIP RRQ sent at Event 412, did not include a Reverse Link (RL) only extension, thus, the AGW 122 can receive and send data packets from and to the eBS-1 184 (i.e., act as primary link/DAP). At Event 416, eBS-1 communicates the DAP assignment to the AT 104.

At Event 418, IOS signaling is established to between the eBS-1 184 and the SRNC 128 and the eBS-1 184 notifies the SNRC 128 of the AGW IP address and the GRE key. At optional Event 420, the AT 104 and the AGW 122 perform IP address assignment, if the AT 122 requests an IP address assignment.

At Event 422, the AT 104 adds eBS-2 186 to the active route set by communicating a route open request to the eBS-2 186. At Event 424, IOS signaling is performed between the eBS-2 186 and the SRNC 128 and eBS-2 186 receives AGW ID, GRE key, PMN-AN-HA key and nonce from the SRNC 128. At Event 426, the eBS-2 186 sends PMIP RRQ to the AGW 122 that includes a Reverse Link (RL) only extension in addition to eBS-2 IP address, Permanent_NAI, GRE extension and MN-HA authentication extension. The AGW 122 verifies MN-HA authentication extension by using PMN-AN-HA key and, if the authentication is successful, at Event 428, the AGW 122 communicates a PMIP RRP to eBS-2 186. It should be noted that since the PMIP RRQ includes an RL only extension, the AGW 122 can only receive packets from eBS-2 186 and cannot send packets to eBS-2 186. At Event 430, eBS-2 186 communicates a route open accept to the AT 104.

At Event 430, the AT 104 communicates a primary link/DAP move request to eBS-2 186 that requests a DAP handoff. In turn, at Event 432, eBS-2 186 sends a PMIP RRQ to the AGW 122 that includes the GRE key, an IP address and the MN-HA authentication extension. AGW 122 verifies the MN-HA authentication extension by implementing the PMN-AN-HA key. If authentication is successful, the AGW 122, at Event 434, communicates a PMIP RRP to the eBS-2 186. It should be noted that since the PMIP RRQ did not include a RL only extension, the AGW 122 can receive and send data packets from and to eBS-2 186. At Event 436, eBS-2 186 sends a DAP assignment to the AT 104.

Figure 9:
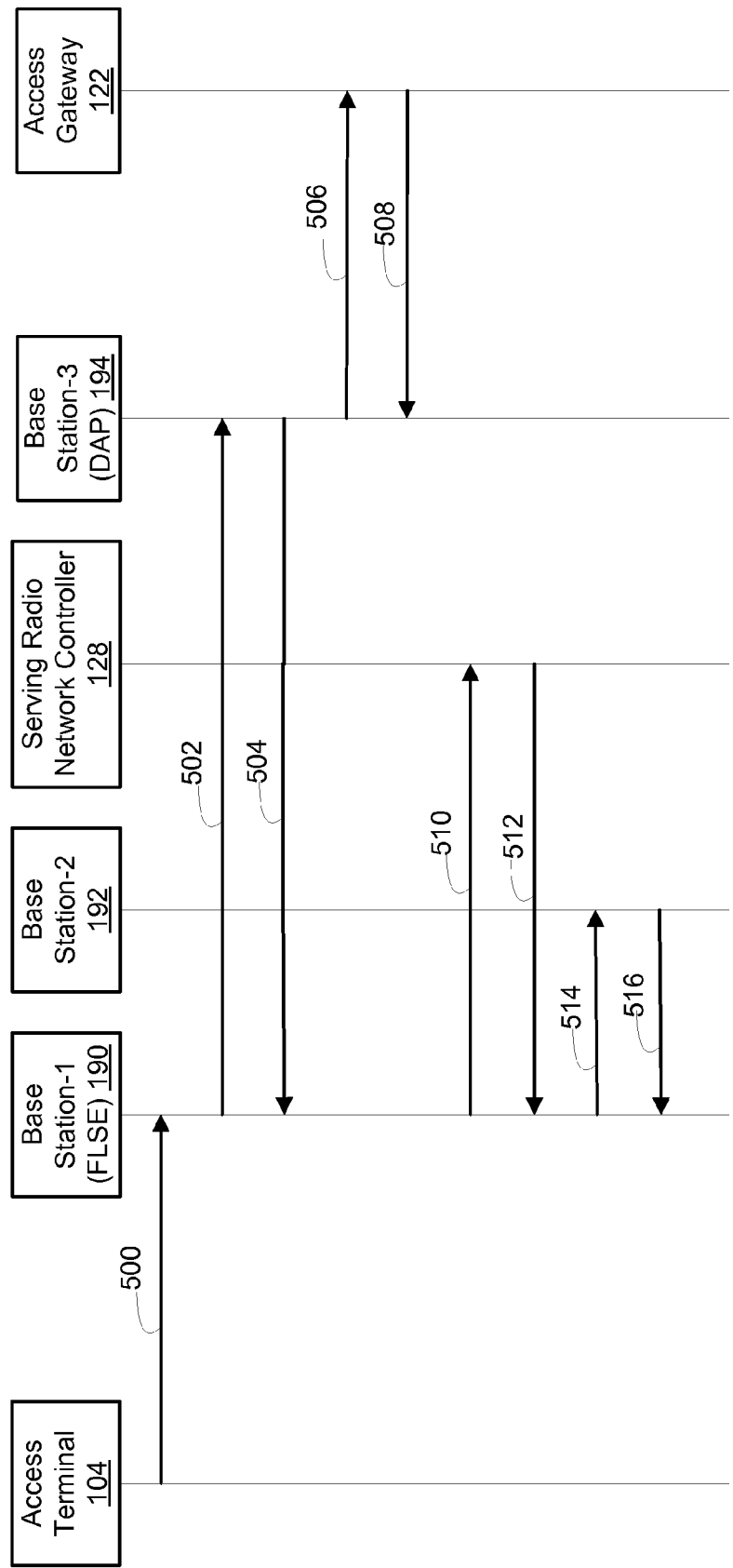
FIG. 9 is a call flow diagram that illustrates an example of signaling flow for an access terminal initiated connection close (i.e., the AT goes idle), in accordance with another aspect of the innovation.

In addition, to providing multiple bindings for data transmission, present aspects also provide multiple bindings for other network communications such as signaling or the like. Referring to FIG. 9, a call flow diagram of signaling flow for an access terminal initiated connection close (i.e., the AT goes idle) in a UMB network, in accordance with another aspect of the innovation. At Event 500, the AT 104 sends a connection close message to the eBS-1 190, which is the Forward Link Serving eBS (FLSE) in this example.

Upon receipt of the connection close message from the AT 104, at Event 502, eBS-1 190 sends an IPT-Notification message with an AT initiated connection close identifier to all active nodes in the route set and the primary binding/Data Attachment Point (DAP) 194, which is designated as eBS-3 in FIG. 9. Upon receipt of the IPT-Notification message, eBS-3/DAP 194 enters paging mode and it can send an IAS-Paging Request message (not shown in FIG. 9) to SRNC 128 whenever it receives IP packets for the AT 104. At Event 504, eBS-3/DAP 194 sends an acknowledgement message to eBS-1 190 acknowledging receipt of the IPT Notification. At this point, the AT 104 can immediately release any RF resources allocated for the AT 104 but maintains information necessary to support PMIP binding and paging.

If eBS-3/DAP 194 cannot buffer data for an idle AT 104 at Event 506, eBS-3/DAP 194 sends a PMIP Registration Request (RRQ) message with a signaling-only binding extension to the AGW 122. It should be noted that the SNRC 128 can move the PMIP signaling binding from eBS-3/DAP 194 to the SNRC 128 any time after the PMIP RRQ message has been sent. At Event 508, upon receipt of the PMIP RRQ, AGW 122 sends a PIMP Registration Reply (RRP) message to eBS-3/DAP 194. If the AGW 122 accepts the signaling-only binding registration, AGW 122 removes any existing signaling only or primary binding and any existing primary binding becomes a reverse-link-only binding. At this point, if AGW 122 receives IP packets for AT 104, AGW 122 buffers the packets and may initiate paging of the AT 104. At this point, AGW 122 stops forwarding to e-SB-3/DAP 194 any future data received and instead follows the call flow depicted in FIG. 10 and described infra.

At Event 510, eBS-1 190 sends an IPT-Notification message to the SNRC 128 with an AT initiated connection close indicator. Upon receipt of the IPT-Notification message by SNRC 128, at Event 512, SNRC 128 enters idle mode and responds to eBS-1 190 with an IP-Notification acknowledgement message. At Event 514, eBS-1 190 sends an IPT-Notification message to the eBS-2 192 with an AT initiated connection close indicator. Upon receipt of the IPT-Notification message by eBS-2 192, at Event 516, eBS-2 192 responds to eBS-1 190 with an IP-Notification acknowledgement message and immediately releases any RF resources allocated for the AT 104. It should be noted that IPT-Notifications sent to eBS-3/DAP 194, SRNC 128 and eBS-2 192, while depicted in series, may be sent (and responded to) in parallel.

Figure 10:
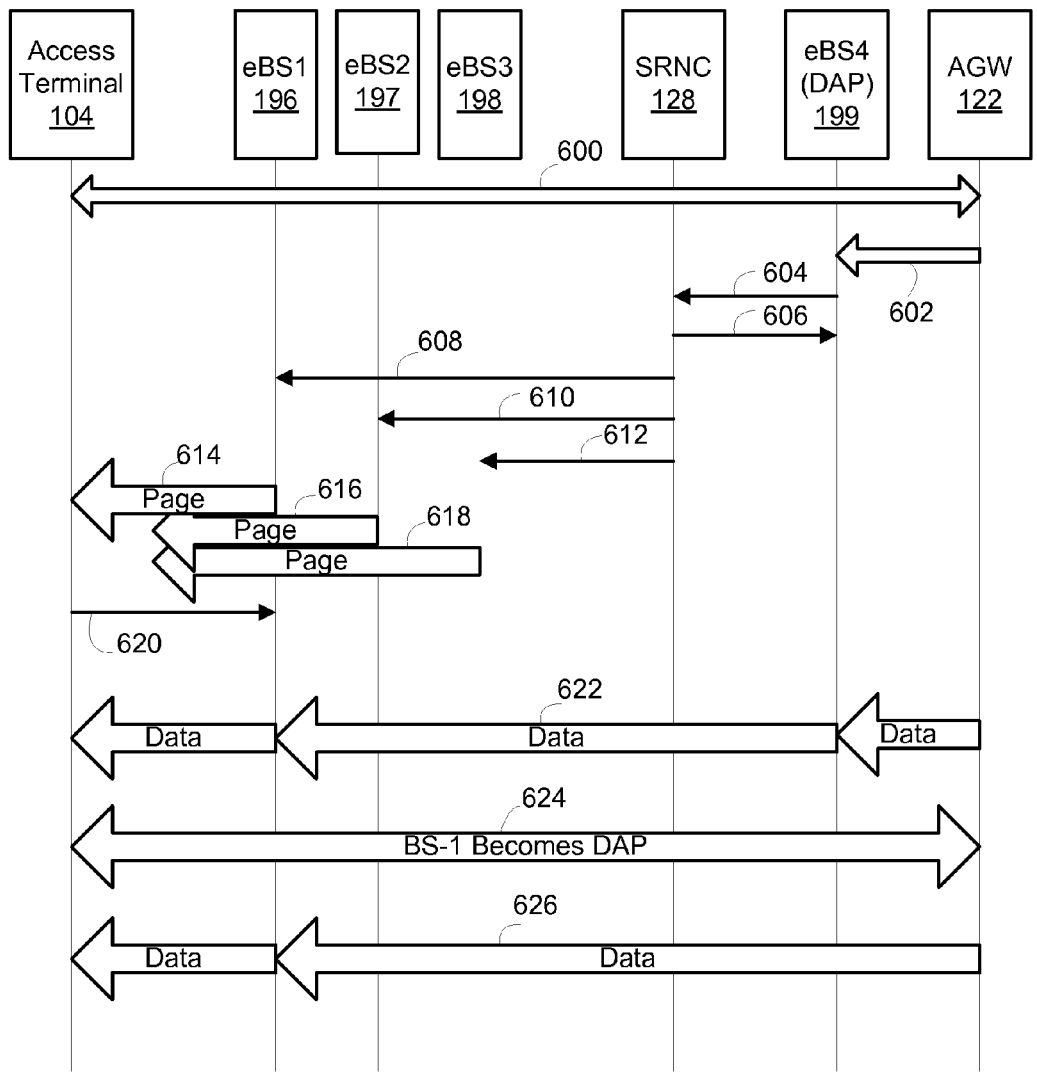
FIG. 10 is a call flow diagram that illustrates an example of paging an Access Terminal (AT) when the AT is idle, according to an aspect of the innovation.

Referring to FIG. 10, a call flow diagram is provided for paging an Access Terminal (AT) 104 when the AT is idle in a UMB network, according to an aspect of the innovation. This example assumes that the PMIP primary binding is kept between eBS-4/DAP 199 and the AGW 122 when the AT 104 goes idle.

At Event 600, the AT 104, SRNC 128 and eBS-4/DAP 199 are in the idle state and the connection between AT 104 and the forward link serving eBS has been closed. In some examples, eBS-4/DAP 199 may have performed flow control to trigger the AGW 122 to buffer data during the idle state. Buffering the data at the AGW 122 provides for no need to further buffer the data at the eBSs.

At Event 602, the eBS-4/DAP 199 receives data for the AT 104 from the AGW 122 or, in the instance in which AGW 122 buffers data, receives a PMIP-Data Notification message from AGW 122 or any entity that performs signaling-only binding indicating that AGW 122 has received data for the AT 104. Either receipt of the data or receipt of the PMIP-Data Notification triggers eBS-4 199 to request paging of the idle AT 104.

At Event 604, eBS-4/DAP 199 sends an IAS-Paging Request message to SRNC 128 that includes priority of the page, the status of the flow control at AGW 122 and a flag indicating that the a paging area is unknown. At Event 606, SRNC 128 responds to receipt of the IAS-Paging Request message with an IAS-Paging Request Acknowledgement message.

After SNRC 128 has determined the paging area, at Events 608, 610 and 612, SNRC 128 sends an IAS-Page message to each eBS in the paging area of AT 104. This example assumes that eBS-1 196, eBS-2 197 and eBS-3 198 are in the paging area of AT 104. The IAS-Paging message includes local fanout required, which may be set to zero to indicate no IAS-Page Acknowledgement message is required. Additionally the IAS-Page message may include the time period for initiating the paging procedure over the air and priority of the page request.

At Events 614, 616 and 618, eBS-1 196, eBS-2 197 and eBS-3 198 page AT 104 at the specified time across the specified channel. Assuming that AT 104 receives the page sent from eBS-1 196, at Event 620, AT 104 responds to the page by performing access procedures, i.e., the AT 104 sends a route open request message to eBS-1 196 to open a route with eBS-1 196. At this point the call flow proceeds according to FIG. 8 as discussed previously.

Once the route has been opened, if eBS-4/DAP 199 has been set up to buffer data when the AT 104 was idle, then at Event 622, any buffered data is communicated from eBS-4 199 to eBS-1 196 and then on to AT 104. Conversely, if AGW 122 had been set up to buffer data when AT 104 is idle, and eBS-4/DAP 199 determines that it remains as the primary binding, then eBS-4/DAP 199 establishes a PMIP binding with the AGW in order to receive forward link data.

At Event 624, eBS-1 196, which is the forward link serving eBS, becomes the primary link/DAP for AT 104. Thus, at Event 626, subsequent forward link data is communicated from AGW 122 to eBS-1 196 and then on to AT 104.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, presents aspects herein described and claimed provide for multiple bindings having independent forward and reverse links in a MIP network environment. By having forward and reverse link bindings that are independent of each other, establishment of one link binding does not affect the establishing or maintaining another link binding. According to one aspect, multiple bindings include multiple reverse link-only bindings that are capable of receiving uplink communication packets and a single forward link binding that is operable to send downlink communication packets. Additionally, according to other aspects, a single primary binding may be established that provides for the only forward link binding and reverse link binding.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for establishing multiple Mobile Internet Protocol (MIP) bindings, comprising:
   setting up a reverse link-only binding through a first network entity for transmitting data from an access terminal;
   setting up a forward link binding through a second network entity for transmitting data to the access terminal, wherein the reverse link-only binding is set up independently of the forward link binding, and wherein the forward link binding comprises a primary binding through the second network entity that allows forward link and reverse link communications;
   transmitting data on the reverse link through the first network entity;
   receiving forward link data transmitted through the second network entity;
   moving the primary binding to a third network entity if quality of a link to the third network entity is preferred over a quality of a link to the second network entity;
   after moving of the primary binding to the third network entity, changing the forward link binding of the second network entity to a reverse link-only binding; and
   upon the access terminal entering an idle mode, setting up a signaling-only binding with an access gateway configured to cause the access gateway to discontinue forwarding of data to the access terminal, to remove all other signaling bindings, to change all primary bindings to reverse link-only bindings, and to notify the access terminal when data is available.

2. The method of claim 1, wherein setting up the reverse link-only binding further comprises setting up a plurality of reverse link-only bindings with a corresponding plurality of network entities.

3. The method of claim 2, wherein transmitting data on the reverse link-only binding further comprises transmitting data through any one of the plurality of reverse link-only bindings through the corresponding network entity.

4. The method of claim 1, wherein setting up the reverse link-only binding further comprises setting up the reverse link-only binding at the access terminal with the first network entity and wherein setting up the forward link binding further comprises setting up the forward link binding at the access terminal with the second network entity.

5. The method of claim 4, wherein setting up the reverse link-only binding further comprises communicating a binding request from the access terminal to the first network entity and, in response to receipt of the binding request by the first network entity, communicating, from the first network entity to a binding registration entity, a binding registration request that includes a reverse link-only extension.

6. The method of claim 5, wherein the binding registration entity is further defined as one of a home agent or the access gateway.

7. The method of claim 1, wherein setting up the forward link binding further comprises maintaining only one forward link binding per associated access terminal at any point in time.

8. The method of claim 1, wherein moving the primary binding to the third network entity further comprises communicating a primary binding move request from the access terminal to the third network entity and, in response to receipt of the primary binding move request by the third network entity, communicating, from the third network entity to a binding registration entity, a binding registration request absent a reverse link-only extension.

9. The method of claim 8, wherein the binding registration entity is further defined as one of a home agent or the access gateway.

10. The method of claim 1, wherein the method is further defined as a method for establishing multiple Proxy Mobile Internet Protocol (PMIP) bindings.

11. The method of claim 10, wherein setting up the reverse link-only binding further comprises setting up the reverse link-only binding at a foreign agent with the first network entity and wherein setting up the forward link binding further comprises setting up the forward link binding at the foreign agent with the second network entity.

12. The method of claim 11, wherein setting up the reverse link-only binding at a foreign agent with the first network entity and setting up the forward link binding at the foreign agent with the second network entity further defines the foreign agent as a base station.

13. At least one processor configured to establish multiple Mobile Internet Protocol (MIP) bindings, comprising:
   a first module for setting up a reverse link-only binding through a first network entity for transmitting data from an access terminal;
   a second module for setting up a forward link binding through a second network entity for transmitting data to an access terminal, wherein the reverse link-only binding is set up independently of the forward link binding, and wherein the forward link binding comprises a primary binding through the second network entity that allows forward link and reverse link communications;
   a third module for transmitting data on the reverse link through the first network entity; and
   a fourth module for receiving forward link data transmitted through the second network entity;
   a fifth module for moving the primary binding to a third network entity if quality of a link to the third network entity is preferred over a quality of a link to the second network entity;
   a sixth module for, after moving of the primary binding to the third network entity, changing the forward link binding of the second network entity to a reverse link-only binding; and
   a seventh module for, upon the access terminal entering an idle mode, setting up a signaling-only binding with an access gateway configured to cause the access gateway to discontinue forwarding of data to the access terminal, to remove all other signaling bindings, to change all primary bindings to reverse link-only bindings, and to notify the access terminal when data is available.

14. A computer program product, comprising:

a non-transitory computer-readable medium comprising:

a first set of codes for causing a computer to set up a reverse link-only binding through a first network entity for transmitting data from an access terminal;

a second set of codes for causing the computer to set up a forward link binding through a second network entity for transmitting data to the access terminal, wherein the reverse link-only binding is set up independently of the forward link binding, and wherein the forward link binding comprises a primary binding through the second network entity that allows forward link and reverse link communications;

a third set of codes for causing the computer to transmit data on the reverse link through the first network entity; and a fourth set of codes for causing the computer to receive forward link data transmitted through the second network entity;

a fifth set of codes for moving the primary binding to a third network entity if quality of a link to the third network entity is preferred over a quality of a link to the second network entity; and a sixth set of codes for, after moving of the primary binding to the third network entity, changing the forward link binding of the second network entity to a reverse link-only binding; and a seventh set of codes for, upon the access terminal entering an idle mode, setting up a signaling-only binding with an access gateway configured to cause the access gateway to discontinue forwarding of data to the access terminal, to remove all other signaling bindings, to change all primary bindings to reverse link-only bindings, and to notify the access terminal when data is available.

15. An apparatus for establishing multiple Mobile Internet Protocol (MIP) bindings, comprising:

means for setting up a reverse link-only binding through a first network entity for transmitting data from an access terminal;

means for setting up a forward link binding through a second network entity for transmitting data to the access terminal, wherein the reverse link-only binding is set up independently of the forward link binding, and wherein the forward link binding comprises a primary binding through the second network entity that allows forward link and reverse link communications;

means for transmitting data on the reverse link through the first network entity;

means for receiving forward link data transmitted through the second network entity;

means for moving the primary binding to a third network entity if quality of a link to the third network entity is preferred over a quality of a link to the second network entity;

means for, after moving of the primary binding to the third network entity, changing the forward link binding of the second network entity to a reverse link-only binding; and means for, upon the access terminal entering an idle mode, setting up a signaling-only binding with an access gateway configured to cause the access gateway to discontinue forwarding of data to the access terminal, to remove all other signaling bindings, to change all primary bindings to reverse link-only bindings, and to notify the access terminal when data is available.

16. A method for providing multiple Mobile Internet Protocol (MIP) bindings, comprising:

receiving at a first network entity a forward link binding request sent from a binding-initiating entity;

establishing a forward link binding for an access terminal with the first network entity based on receipt of the forward link binding request;

establishing a reverse link-only binding for the access terminal with a second network entity based on receipt of a reverse link binding request at the second network entity, wherein the reverse link-only binding is established independent of the forward link binding, and wherein the forward link binding comprises a primary binding through the first network entity that allows forward link and reverse link communications;

moving the primary binding to a third network entity if quality of a link to the third network entity is preferred over a quality of a link to the first network entity; and after moving of the primary binding to the third network entity, changing the forward link binding of the first network entity to a reverse link-only binding; and upon the access terminal entering an idle mode, setting up a signaling-only binding with an access gateway configured to cause the access gateway to discontinue forwarding of data to the access terminal, to remove all other signaling bindings, to change all primary bindings to reverse link-only bindings, and to notify the access terminal when data is available.

17. The method of claim 16, wherein receiving at a first network entity a forward link binding request sent from a binding-initiating entity further defines the binding-initiating entity as one of the access terminal or a foreign agent.

18. The method of claim 16, wherein receiving a reverse link binding request at the second network entity further comprises receiving, at a plurality of second network entities, reverse link-only binding requests sent from the same binding-initiating entity as the forward link binding request.

19. The method of claim 18, wherein establishing the reverse link-only binding further comprises establishing a respective reverse link-only binding with each of the corresponding plurality of second network entities.

20. The method of claim 16, wherein establishing the forward link binding with the first network entity further comprises generating at the first network entity a registration request that includes a reverse link-only extension and communicating the registration request to a binding registration entity.

21. The method of claim 20, wherein communicating the registration request to a binding registration entity further comprises communicating the registration request to one of a home agent or an access gateway.

22. The method of claim 16, wherein establishing a forward link binding further comprises maintaining the forward link binding as the only forward link binding for the associated access terminal.

23. The method of claim 16, further comprising receiving at the third network entity a primary binding move request sent from the binding-initiating entity.

24. The method of claim 23, further comprising generating at the third network entity a registration request that is absent a reverse link-only extension and communicating the registration request to the binding registration entity.

25. The method of claim 24, wherein communicating the registration request to the binding registration entity further comprises communicating the registration request to one of a home agent or an access gateway.

26. At least one processor configured to provide multiple Mobile Internet Protocol (MIP) bindings, comprising:
- a first module for receiving at a first network entity a forward link binding request sent from a binding-initiating entity;
- a second module for establishing a forward link binding for an access terminal with the first network entity based on receipt of the forward link binding request;
- a third module for establishing a reverse link-only binding for the access terminal with a second network entity based on receipt of the reverse link-only binding request;
- wherein the reverse link-only binding is established independent of the forward link binding, and wherein the forward link binding comprises a primary binding through the first network entity that allows forward link and reverse link communications;
- a fourth module for moving the primary binding to a third network entity if quality of a link to the third network entity is preferred over a quality of a link to the first network entity;
- a fifth module for, after moving of the primary binding to the third network entity, changing the forward link binding of the first network entity to a reverse link-only binding; and
- a sixth module for, upon the access terminal entering an idle mode, setting up a signaling-only binding with an access gateway configured to cause the access gateway to discontinue forwarding of data to the access terminal, to remove all other signaling bindings, to change all primary bindings to reverse link-only bindings, and to notify the access terminal when data is available.

27. A computer program product, comprising:
a non-transitory computer-readable medium comprising:
- a first set of codes for causing a computer to receive at a first network entity a forward link binding request sent from a binding-initiating entity;
- a second set of codes for causing the computer to establish a forward link binding for an access terminal with the first network entity based on receipt of the forward link binding request; and
- a third set of codes for causing the computer to establish a reverse link-only binding for the access terminal with a second network entity based on receipt of the reverse link-only binding request,
- wherein the reverse link-only binding is established independent of the forward link binding, and wherein the forward link binding comprises a primary binding through the first network entity that allows forward link and reverse link communications;
- a fourth set of codes for moving the primary binding to a third network entity if quality of a link to the third network entity is preferred over a quality of a link to the first network entity;
- a fifth set of codes for, after moving of the primary binding to the third network entity, changing the forward link binding of the first network entity to a reverse link-only binding; and
- a sixth set of codes for, upon the access terminal entering an idle mode, setting up a signaling-only binding with an access gateway configured to cause the access gateway to discontinue forwarding of data to the access terminal, to remove all other signaling bindings, to change all primary bindings to reverse link-only bindings, and to notify the access terminal when data is available.

28. An apparatus for establishing multiple Mobile Internet Protocol (MIP) bindings, comprising:
- means for receiving at a first network entity a forward link binding request sent from a binding-initiating entity;
- means for establishing a forward link binding for an access terminal with the first network entity based on receipt of the forward link binding request;
- means for establishing a reverse link-only binding for the access terminal with a second network entity based on receipt of a reverse link-only binding request,
- wherein the reverse link-only binding is established independent of the forward link binding, and wherein the forward link binding comprises a primary binding through the first network entity that allows forward link and reverse link communications;
- means for moving the primary binding to a third network entity if quality of a link to the third network entity is preferred over a quality of a link to the first network entity; and
- means for, after moving of the primary binding to the third network entity, changing the forward link binding of the first network entity to a reverse link-only binding; and
- means for, upon the access terminal entering an idle mode, setting up a signaling-only binding with an access gateway configured to cause the access gateway to discontinue forwarding of data to the access terminal, to remove all other signaling bindings, to change all primary bindings to reverse link-only bindings, and to notify the access terminal when data is available.

29. A network system for establishing multiple Mobile Internet Protocol (MIP) bindings, comprising:
- a first network entity operable to receive a forward link binding request sent from a binding-initiating entity and establish a forward link binding for an access terminal with the first network entity based on receipt of the forward link binding request;
- a second network entity operable to receive a reverse link-only binding request sent from the binding-initiating entity and establish a reverse link-only binding for the access terminal with the second network entity based on receipt of the reverse link binding request,
- wherein the reverse link-only binding is established at the second network entity independent of the forward link binding established at the first network entity, and wherein the forward link binding comprises a primary binding through the first network entity that allows forward link and reverse link communications;
- a third network entity operable to receive the primary binding from the first network entity if quality of a link to the third network entity is preferred over a quality of a link to the first network entity and, after moving of the primary binding to the third network entity, changing the forward link binding of the first network entity to a reverse link-only binding; and
- wherein the third network entity is operable to, upon the access terminal entering an idle mode, set up a signaling-only binding with an access gateway configured to cause the access gateway to discontinue forwarding of data to the access terminal, to remove all other signaling bindings, to change all primary bindings to reverse link-only bindings, and to notify the access terminal when data is available.

30. The system of claim 29, further comprising a binding registration entity operable to receive, from the second network entity, a registration request that includes a reverse link-only extension and to register the second network entity as a reverse link-only binding for the access terminal.

31. The system of claim 29, wherein the first network entity is further operable to maintain the forward link binding as the only forward link for the access terminal.

32. The system of claim of claim 29, wherein the third network entity is operable to receive a primary binding move request sent from the binding-initiating entity and establish a primary binding for the access terminal with the third network entity.

33. The system of claim 32, further comprising a binding registration entity that is operable to receive, from the third network entity, a registration request absent a reverse link-only extension and to register the third network entity as the primary binding for the access terminal.

* * * * *